US008700416B2

(12) United States Patent
Thomas et al.

(10) Patent No.: US 8,700,416 B2
(45) Date of Patent: Apr. 15, 2014

(54) VIRTUAL VEHICLE SYSTEM

(75) Inventors: Robert M. Thomas, S. Lyon, MI (US); Sheenhui Shiue, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1976 days.

(21) Appl. No.: 11/847,550

(22) Filed: Aug. 30, 2007

(65) Prior Publication Data

US 2009/0063172 A1 Mar. 5, 2009

(51) Int. Cl.
*G06Q 99/00* (2006.01)

(52) U.S. Cl.
USPC ............................... 705/1.1; 705/29; 700/107

(58) Field of Classification Search
CPC ........................... G06Q 50/04; G06Q 10/0875
USPC ....................................... 705/1.1, 29; 700/107
See application file for complete search history.

(56) References Cited

U.S. PATENT DOCUMENTS

| | | | |
|---|---|---|---|
| 5,146,404 A | 9/1992 | Calloway et al. | |
| 5,283,865 A | 2/1994 | Johnson | |
| 5,307,261 A * | 4/1994 | Maki et al. | 705/29 |
| 5,311,424 A * | 5/1994 | Mukherjee et al. | 705/29 |
| 6,002,855 A | 12/1999 | Ladner et al. | |
| 6,205,447 B1 * | 3/2001 | Malloy | 1/1 |
| 6,754,564 B2 | 6/2004 | Newport | |
| 6,928,396 B2 | 8/2005 | Thackston | |
| 7,536,318 B1 * | 5/2009 | Wolfe et al. | 705/26 |
| 2002/0059270 A1 * | 5/2002 | Schlabach et al. | 707/100 |
| 2002/0194160 A1 * | 12/2002 | Garrow et al. | 707/2 |
| 2004/0019604 A1 * | 1/2004 | Ballas et al. | 707/104.1 |
| 2004/0267689 A1 * | 12/2004 | Gavlak et al. | 707/1 |
| 2005/0278271 A1 * | 12/2005 | Anthony et al. | 706/919 |
| 2006/0129262 A1 | 6/2006 | Zayic et al. | |
| 2006/0167630 A1 * | 7/2006 | Noma et al. | 701/211 |
| 2007/0038422 A1 | 2/2007 | Wang et al. | |
| 2009/0033656 A1 * | 2/2009 | Larkins et al. | 345/419 |

* cited by examiner

*Primary Examiner* — Scott A Mattia
(74) *Attorney, Agent, or Firm* — Ralph E. Smith

(57) ABSTRACT

A system for providing vehicle part information includes a build configuration module that provides delta information that indicates a change in build configurations for vehicles. The build configuration indicates vehicle parts that were used at specific manufacturing plants on the vehicles during a time period. A build data module includes vehicle identification information that indicates predetermined build parameters for the vehicles. A display control module includes a database that combines the delta information and the vehicle identification information in a matrix and that stores the matrix.

16 Claims, 4 Drawing Sheets

VIRTUAL VEHICLE SYSTEM

FIELD

The present disclosure relates to vehicle data and more particularly to use and distribution of vehicle data within a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle identification numbers (VINs) include a series of numbers that uniquely identify motor vehicles. VINs may include, among other things, vehicle manufacturers, types, models, body styles, and individual information, individual vehicle information may include, for example, options installed or engine and transmission choices.

VIN specific systems attempt to provide parts information for most or all vehicles by associating the component parts of the vehicle with the respective VIN. Such systems often require massive storage databases that store almost every detail of every vehicle. Massive databases are required because each vehicle may include over three thousand parts and the databases should store at least a list of those parts to be complete. Some vehicle manufacturers physically write down all the information for parts associated with a particular vehicle rather than support large databases.

SUMMARY

A system for providing vehicle part information includes a build configuration module that provides delta information that indicates a change in build configurations for vehicles. The build configuration indicates vehicle parts that were used at specific manufacturing plants on the vehicles during a time period. A build data module includes vehicle identification information that indicates predetermined build parameters for the vehicles. A display control module combines the delta information and the vehicle identification information in a matrix and stores the matrix in a database.

In other features, the vehicle identification information includes vehicle identification number (VIN) data. The display control module generates the matrix based on build date of the vehicles, the VIN data, and the build configuration. The display control module outputs a parts list for one of the vehicles based on a VIN for the vehicle. The display control module generates a virtual image of at least one of the vehicles based on the delta information and the vehicle identification information. A service parts data module includes data on service parts for the vehicles. The display control module generates the virtual image based on the service parts data. The display control module comprises a graphic bill of materials (GBOM) system.

In other features, a system for providing vehicle part information includes a build configuration module that provides delta information that indicates a change in a vehicle build configuration. The vehicle build configuration indicates vehicle parts that were used at specific manufacturing plants on vehicles during a time period. A build data module includes vehicle identification information that indicates predetermined build parameters for the vehicles. A display control module generates a virtual image of at least one of the vehicles based on the delta information and the vehicle identification information.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
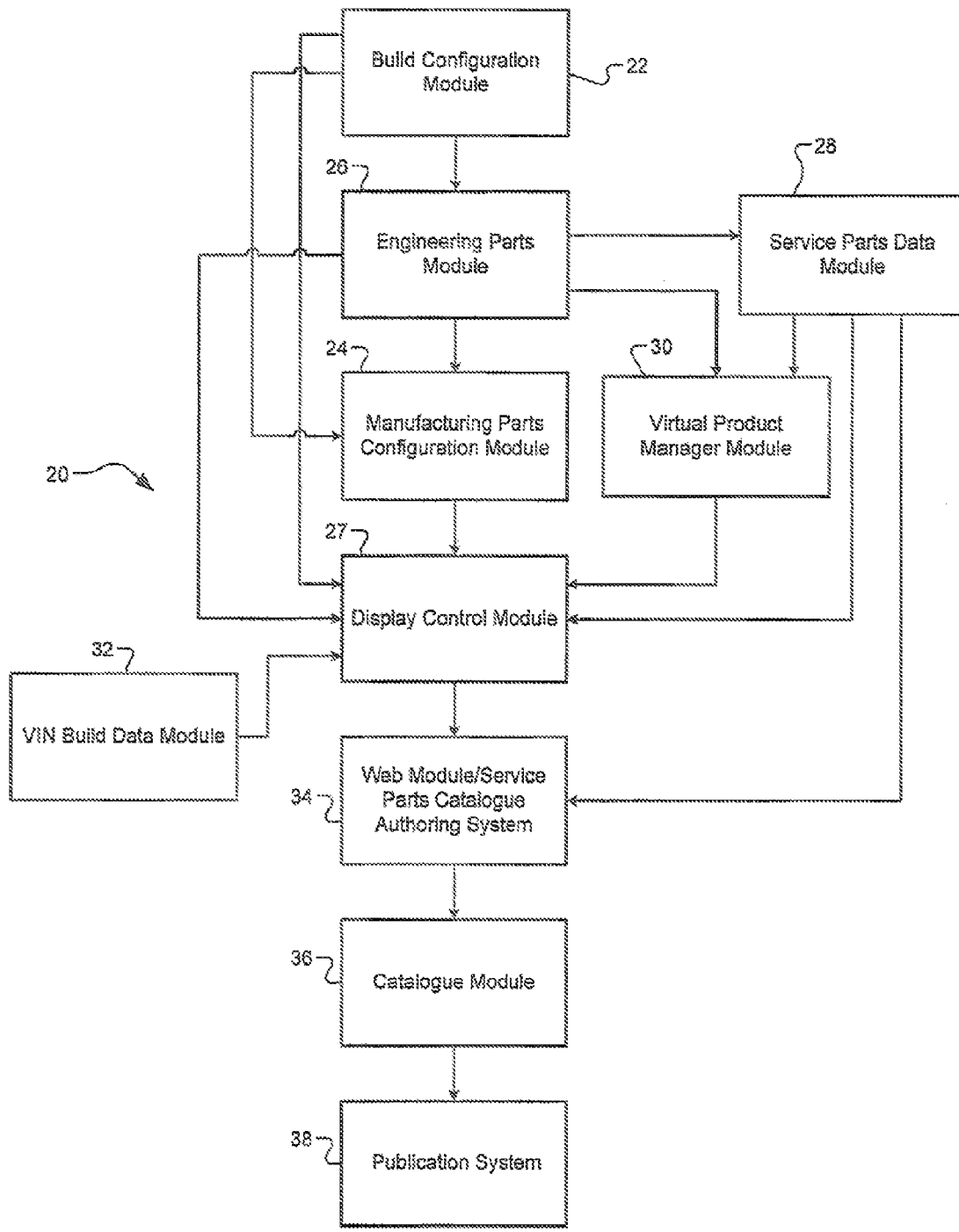
FIG. 1 is a vehicle service system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Parts for vehicles are constantly being interchanged in manufacturing systems. Storing information for all of the parts/locations may be inefficient. For example, a user may input a first part number to a manufacturing system that indicates a respective part is good for a first plant and a group of vehicles only. A second user may make a change (delta) to the vehicle design of the group of vehicles and replace the first part number with a second part number. These types of changes may occur frequently.

Generally, the present manufacturing system includes configuration data that dictates whether a part may be put on a vehicle and/or what parts are compatible with a particular vehicle type. Rather than deleting the configure data, as in previous manufacturing systems, a database stores the configuration data by date. The database may also store or indicate when changes (deltas) where made to a type of vehicle. Deltas may include modifications to a vehicle design such that a different part is used on the vehicle than was previously used.

The database may also store vehicle identification number (VIN) sales data. VIN data includes recorded sales for a respective VIN. Build parameters such as make, model, and engine type may be associated with each VIN. The build parameters correspond to respective configuration data.

A system control module may generate a data matrix based on VIN data, deltas, and configuration data. In other words, the matrix may include two, three, or more than three dimensions, whereby the intersection of parameters (e.g. VIN data, deltas, and configuration data) indicates a specific set of parts. This indication may result from a set of codes wherein intersections of matrix parameters correspond to respective codes. Each of the codes may be related to a make, model, body type, engine type and all changes to parts of the vehicle, and all unchanged parts of the vehicle (which do not have delta information). Therefore, the parts data for a vehicle that includes all original parts and updated (delta) parts may therefore be extracted from manufacturer parts lists based on the codes.

For any VIN, the matrix may therefore output a parts list for a specific vehicle based on original parts and updated/changed parts. All service parts that correspond to equivalent parts on the parts list may be represented as a 3-D image, and this 3-D image may be referred to as a virtual service vehicle. Therefore it is not necessary to store parts for every vehicle because the vehicle configurations are known, the parts that were used on the date the vehicle was built are also known, and all changes to parts of the vehicle are known.

Figure 2:
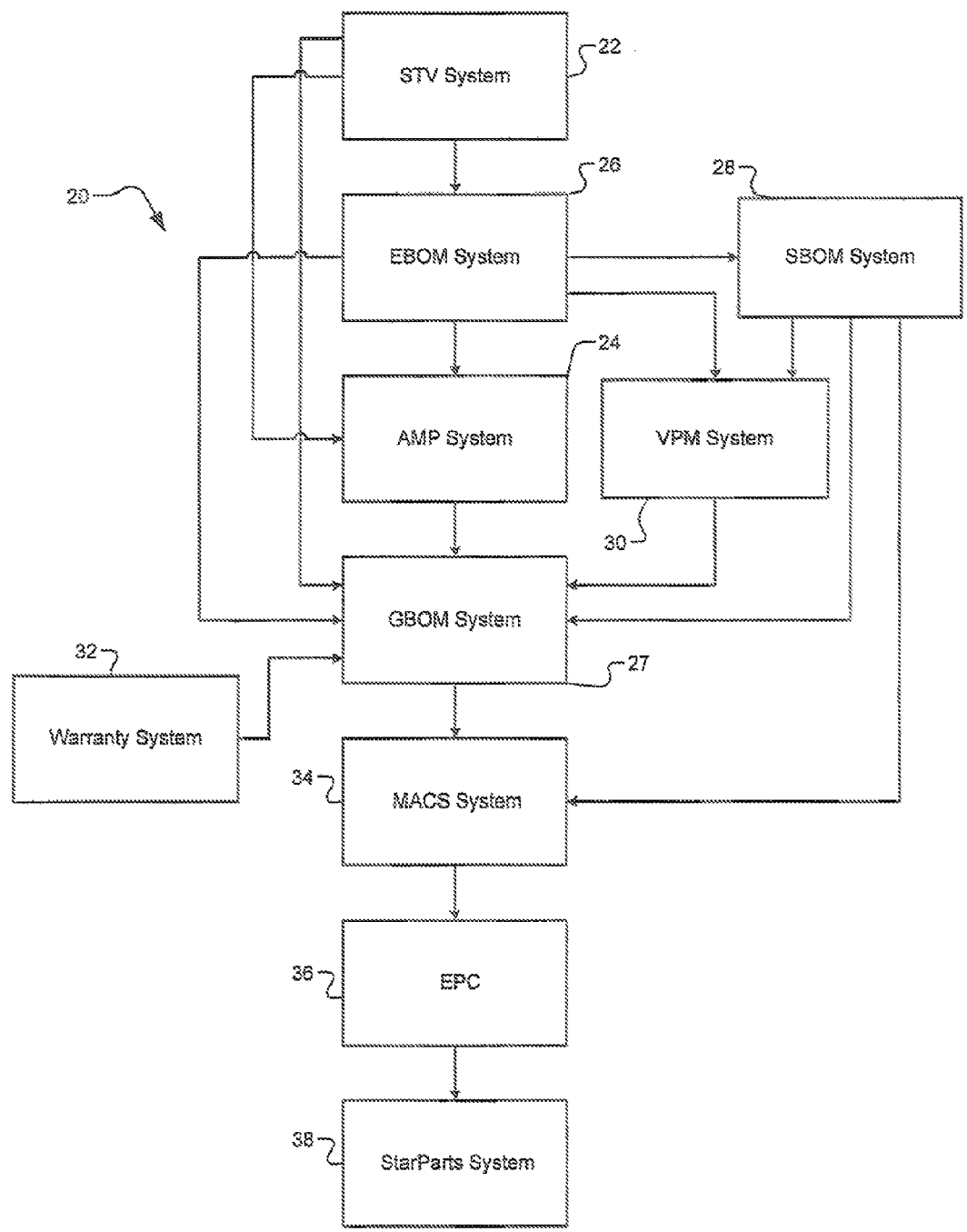
FIG. 2 is a vehicle service system according to the present disclosure.
Figure 3:
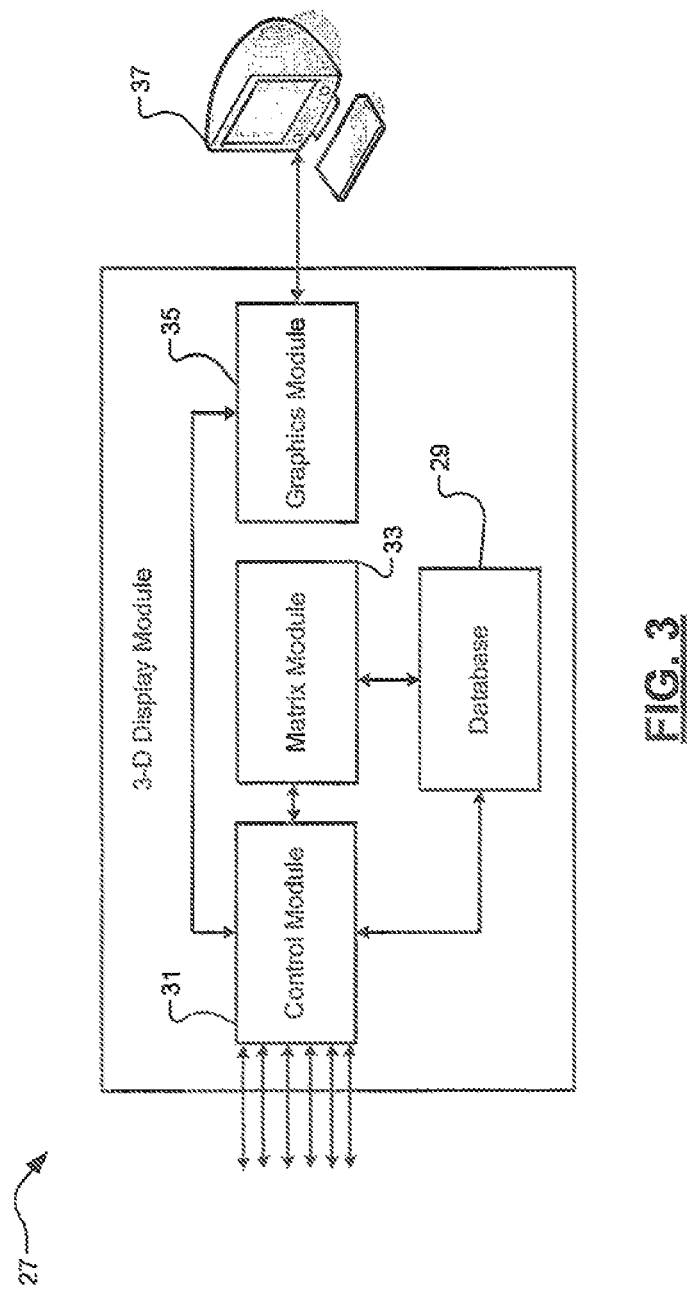
FIG. 3 is a display control module according to the present disclosure.

Referring now to FIGS. 1-3, a vehicle service system 20 is illustrated. The system 20 may include a plurality of sub-systems that interact remotely or within a close proximity of one another through a network. Each sub-system may be represented as a module, as in FIGS. 1 and 2 or alternatively as a plurality of modules. Each sub-system may also include a user interface whereby a user may input and/or view system data and/or images.

The plurality of sub-systems may include a build configuration module 22. A manufacturing parts configuration module 24, an engineering parts module 26, and a system display control module 27 may receive signals from the build configuration module 22. The system display control module 27 may also receive signals from a service parts data module 28, a virtual product manager (VPM) module 30, the engineering module 26, the manufacturing parts configuration module 24, and a VIN build data module 32. A web system module/service parts catalogue authoring system 34, a catalogue system 36 and a parts distribution/publication system 38 may receive data from the display system module 27.

The build configuration module 22 may include or be part of a Specify The Vehicle (STV) system. The build configuration module 22 provides an overall vehicle configuration/description based on a desired vehicle design from a pre-design or concept phase of a manufacturing operation.

The manufacturing parts configuration module 24 may include or be part of an advance manufacturing (AMP) system, the engineering parts module 26 may include or be part of an engineering bill of materials (EBOM) system. A BOM is a data structure that describes a product in terms of its assemblies, sub-assemblies, and basic parts. BOMs are used for design and manufacture of product and basically include a list of parts.

The system display control module 27 may include or be part of a graphic BOM (GBOM) system. The manufacturing parts configuration module 24 also receives signals from the engineering parts module 26, the build configuration module 22, and the engineering parts module 26. The manufacturing parts configuration module 24 may store allowable engineering part configurations by date. Previous systems stored this information until the next day when it was replaced with new data for that new day.

The display control module 27 uses the delta information from the manufacturing parts configuration module 24 to obtain the specific part number for a specific day. The display control module 27 may include a sub-control module 31 that captures deltas from the manufacturing parts configuration module 24 and stores them in a database 29. The database 29 may therefore include all actual parts for a vehicle based on a master parts list for each day and respective changed parts. The display control module 27 may also include a matrix module 33 that generates the matrix and a graphics module 35 that generates the 3-D virtual service parts vehicle that may be viewed on a monitor 37.

The display control module 27 may filter out certain parts based on inputs. For example, for an automatic V6, other parts for similar vehicles, such as manual V8 parts may be filtered out. A user may input a VIN, and the display control module 27 may filter down to a year the parts that apply to the VIN. The display control module 27 determines the range of parts are good for the vehicle and the parts that are interchangeable with those parts. The system therefore informs the user exactly how the vehicle was built, which prior systems cannot do without massive storage of data.

The service parts data module 28 may include or be part of a service BOM (SBOM) system, the virtual product manager module 30 may include or be part of a VPM system, the VIN build data module 32 of a warranty system may include or be part of a warranty system.

The service parts data module 28 may include information on all parts for production. In the service parts data module 28, parts, such as engines, may be broken down into component parts using those usages they came through from the build configuration module 22. Engineering information typically includes engineering drawings and parts lists that, when combined, form an engineering product structure generally known as an Engineering Bill of Material (EBOM). The EBOM describes how materials, components assemblies and sub-assemblies are combined to form the desired product, and thus defines the as-designed configuration of the product.

The virtual product manager module 30 may include a computer aided design (CAD) system, computer aided manufacturing system (CAM), and/or a computer aided engineering (CAE) system for designing and developing a vehicle package or the like. For example, the CAD system may be a Computer Aided Three dimensional Interactive Application (CATIA) system. CATIA may support multiple stages of product development. The stages range from conceptualization, through design (CAD) and manufacturing (CAM), until analysis (CAE). The virtual product manager module 30 generates a 2-dimensional (2-D) and/or 3-D image of a vehicle or parts of the vehicle.

The virtual product manager module 30 provides digitized data, particularly CAD or vector data (or another data format), which can be visualized, of at least two components of the vehicle. The data can be provided, for example, on a DVD, CD-ROM or in a databank accessible online. The graphics module 35 may use virtual configuration model images when generating the virtual service parts vehicle.

The engineering parts module 26 may trigger parts usage strings attached to parts numbers based on descriptions from the build configuration module 22. For example, for a part for a V8 convertible, the system obtains the engine code for V8 and the code that applies to convertibles to generate the parts usage string. The usage string may be attached to the part number. A part number may then be released/identified in the engineering parts module 26 based on the usage string. The engineering parts module 26 releases the part using the usage descriptions from the build configuration module 22.

In the manufacturing parts configuration module 24, specific parts are designated appropriate for a specific vehicle on a specific day. The delta information indicates those parts are the only parts that may be used to build a vehicle. If the correct parts are not available, the plants cease production as may be regulated by the manufacturing parts configuration module 24. The display control module 27 receives data from the service parts data module 28, the engineering parts module 26, the virtual product manager module 30 (where the CATIA/image data is stored), the manufacturing parts configuration module 24, and the VIN build data module 32.

Engineering designs and builds the vehicle in 3-D via a CAD system, such as CATIA. The virtual product manager module 30 stores the 3-D data. The display control module 27 may convert the CATIA data into graphics that are usable in the web module 34 and may strip the 3-D data into less detailed 3-D models. A user may view an entire car in the display control module 27 with all of the stripped image data. The display control module 27 may therefore display a 3-D virtual service vehicle. The virtual service vehicle may be made up of visual representations of service parts. The display control module 27 receives the date ranges of the service parts from the service parts data module 28 and the manufacturing parts configuration module 24.

The engineering parts module 26 feeds the virtual product manager module 30, and then the virtual product manager module 30 generates CAD data and attaches it to the part number so that a part may be released. The display control module 27 provides a display of the whole vehicle and each individual part of the vehicle in 3-D.

The display control module 27 generates the 3-D database based on the manufacturing parts configuration module 24 delta data and warranty system VIN data. The VIN is input, and that vehicle configuration is pulled up because the display control module 27 stores information including parts and the dates they were used for specific vehicles and the VINs of those vehicles (from the manufacturing parts configuration module 24). The parts and/or a 3-D representation of the vehicle as built (or to be built) may be displayed on a monitor 37.

The web system 34, which may be an authoring system for a service parts catalog may receive display control module information. An electronic warehouse or catalogue module 36 may store all the 3-D representations and associated data from the web system 34. A publication system 38, such as StarParts, may distributed parts to dealers.

Figure 4:
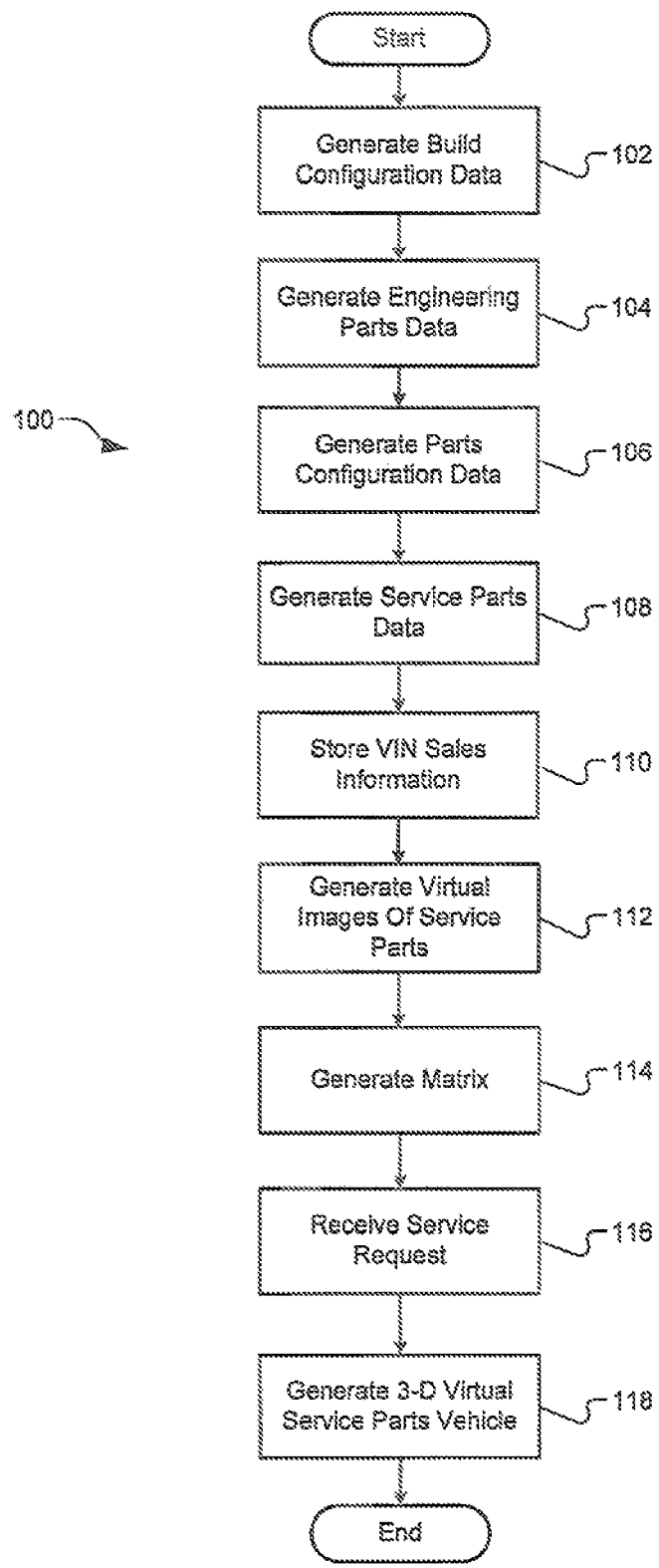
FIG. 4 illustrates a method for operating a manufacturing system according to the present disclosure.

Referring now to FIG. 4, a method 102 for providing vehicle/VIN data is illustrated. Control starts in steps 102-110 where the system generates build configuration data, engineering parts data, parts configuration data, and service parts data and stores VIN sales information. In step 112, the virtual images of service parts are generated. In step 114, the display control module generates a matrix based on the information provided in steps 102-112.

In step 116, a service request may be made for a vehicle part for a particular vehicle. The system may provide a range of parts that apply to the vehicle. However, since the system has been capturing the deltas, the system has information indicating a particular range of VINs use a particular part. The system 20 stores the fact that that part was vehicle appropriate between the first and second time periods and the range of VINs having the respective range of serial numbers. However, the part number may not be applicable because that vehicle is built in a different configuration.

In the present disclosure a vehicle manufacturing system includes storing deltas that indicate specific parts are good at specific plants from a first time period to a second time period. The delta information may include a range of serial numbers for parts that are appropriate for a particular plant between first and second time periods. In other words, a range of information for parts is saved that would be appropriate for a particular vehicle or vehicle make/model.

Previously, users could use a sales code descriptive corresponding to a VIN that is saved permanently with the vehicle to determine parts that were applicable for a vehicle. For example, a console replacement for a 2008 Dodge Stratus could be one of six different parts/part numbers that correspond to six changes in parts used at the manufacturing plant. By saving delta information, a user can now narrow it down to the exact type of part for a particular VIN. The display control module 27 may then generate a 3-D representation of the vehicle with the part in step 118. The 3-D representation may be referred to as VIN filtered.

In operation, a remote technician or parts supplier may then be able to virtually see the vehicle in the service station. If a dealer contacts the remote technician with a question relating to a vehicle and/or part, the system may provide an entire virtual 3-D car remotely for a visual representation of the vehicle, part(s), and parts location(s) on the vehicle.

The present disclosure therefore includes a vehicle service system that provides a virtual service vehicle in three dimensions. The virtual service vehicle may be provided based on a VIN and may include all of the service parts that would be used to construct the vehicle if it were completely constructed of service parts. The virtual service vehicle may be provided in a reduced detail format to conserve service system resources.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for providing vehicle part information comprising:
 a non-transitory computer readable medium storing computer readable instructions, which when executed by a processor, implement modules comprising:
 a build configuration module configured to provide standard build configurations and standard part numbers for vehicles produced at a particular plant during a particular time period;
 a build data module that is configured to store vehicle identification information for build configurations each vehicle produced including date of manufacture and part numbers that differ from said standard part numbers based on said date of manufacture such that said build data module only stores said date of manufacture and said part numbers that differ from said standard part numbers for each vehicle produced; and
 a display control module that comprises a database and that is configured to combine said configuration information, said parts standard part numbers, and said part numbers that differ from said standard part numbers in a matrix and that stores said matrix in said database, such that vehicle parts used to manufacture the particular vehicle can be determined from the matrix based on vehicle information of the particular vehicle, the display control module being further configured to generate a virtual image of at least one of said vehicles.

2. The system of claim 1 wherein said vehicle identification information includes vehicle identification number (VIN) data.

3. The system of claim 2 wherein said display control module is configured to generate said matrix based on at least one of build date, date and time stamp, and serial build code of said vehicles, said VIN data, and said build configuration.

4. The system of claim 3 wherein said display control module is configured to output a parts list for one of said vehicles based on a VIN for said vehicle.

5. The system of claim 1 further comprising a service parts data module configured to provide data on service parts for said vehicles, wherein said display control module is configured to generate said virtual image based on said service parts data.

6. The system of claim 1 wherein said display control module comprises a graphic bill of materials (GBOM) system that displays the virtual image.

7. A system for providing vehicle part information comprising:
   a non-transitory computer readable medium storing computer readable instructions, which when executed by a processor, implement modules comprising:
      a configuration module for vehicles produced at a particular plant during a particular time period operable to store changes to standard vehicle parts for vehicles produced at a particular plant during a particular time period based on a date of manufacture and operable to store vehicle identification information for each vehicle produced during said particular time period, said configuration module only storing said vehicle identification information and said changes to said standard vehicle parts for each vehicle produced; and
      a display control module that is configured to generate a virtual image of at least one of said vehicles based on a configuration of said at least one of said vehicles, said changes to said standard vehicle parts, and said vehicle identification information, such that vehicle parts used to manufacture the particular vehicle can be determined from the virtual image.

8. The system of claim 7 further comprising a service parts data module configured to provide data on service parts for said vehicles, wherein said display control module is configured to generate said virtual image based on said service parts data.

9. The system of claim 7 wherein said vehicle identification information comprises vehicle identification numbers (VINs).

10. The system of claim 9 further comprising a VIN build data module configured to provide said VINs based on vehicle sales data.

11. The system of claim 9 wherein at least one of vehicle make, vehicle model, and vehicle engine type are associated with said VINs.

12. A method for providing vehicle part information, comprising:
   storing, by a processor on a non-transitory computer readable medium, build configurations for vehicles produced at a particular plant during a particular time period;
   storing, by the processor on the non-transitory computer readable medium, vehicle identification information that indicates predetermined build parameters for said vehicles;
   storing, by the processor on the non-transitory computer readable medium, only vehicle parts that differ from standard vehicle parts for each vehicle produced at a particular plant for a particular time period;
   combining, by the processor, said configuration information, said vehicle parts that differ from said standard vehicle parts, and said vehicle identification information in a matrix;
   determining, by the processor, vehicle parts used in originally manufacturing the particular vehicle by referencing the vehicle information of the particular vehicle on the matrix;
   generating by the processor, a virtual image of at least one of said vehicles based on said matrix; and
   generating, by the processor, a virtual image of at least one of said vehicles.

13. The method of claim 12 wherein said vehicle identification information includes vehicle identification number (VIN) data.

14. The method of claim 13 further comprising generating said matrix based on at least one of build date, date and time stamp, and serial build code of said vehicles, said VIN data, and said build configuration.

15. The method of claim 14 further comprising outputting a parts list for one of said vehicles based on a VIN for said vehicle.

16. The method of claim 12 further comprising generating said virtual image based on service parts data.

* * * * *